United States Patent
Eisner et al.

(10) Patent No.: US 6,821,437 B1
(45) Date of Patent: Nov. 23, 2004

(54) METHOD FOR SEPARATING A MACHINING SUSPENSION INTO FRACTIONS

(75) Inventors: Peter Eisner, Freising (DE); Andreas Malberg, München (DE); Michael Menner, Eichenau (DE); Axel Borcherding, München (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 84 days.

(21) Appl. No.: 10/130,768
(22) PCT Filed: Oct. 31, 2000
(86) PCT No.: PCT/DE00/03858
§ 371 (c)(1),
(2), (4) Date: Jul. 18, 2002
(87) PCT Pub. No.: WO01/43933
PCT Pub. Date: Jun. 21, 2001

(30) Foreign Application Priority Data

Dec. 14, 1999 (DE) .......................................... 199 60 380

(51) Int. Cl.⁷ ................................................. C02F 1/48
(52) U.S. Cl. .................... 210/695; 209/39; 210/634; 210/770; 210/773; 210/774; 210/787; 210/806
(58) Field of Search ................................ 210/695, 634, 210/774, 772, 773, 787, 806, 770; 451/60, 446, 88; 209/3, 39

(56) References Cited

U.S. PATENT DOCUMENTS

| | | | |
|---|---|---|---|
| 3,997,359 A | | 12/1976 | Dankoff et al. |
| 5,830,369 A | * | 11/1998 | Toyama ..................... 210/773 |
| 6,001,265 A | * | 12/1999 | Toyama et al. ............. 210/712 |
| 6,120,354 A | * | 9/2000 | Koos et al. .................... 451/41 |
| 6,146,251 A | * | 11/2000 | Fukui et al. ................... 451/42 |
| 6,264,843 B1 | * | 7/2001 | Wiesner ..................... 210/695 |
| 6,381,830 B1 | * | 5/2002 | Chikuba et al. ............. 29/557 |
| 6,656,359 B1 | * | 12/2003 | Osuda et al. ............... 210/636 |

FOREIGN PATENT DOCUMENTS

EP 0 786 317 A2 7/1997

* cited by examiner

Primary Examiner—Joseph Drodge
(74) Attorney, Agent, or Firm—Breiner & Breiner, L.L.C.

(57) ABSTRACT

The present invention relates to a method of separating a machining suspension into fractions including abrasive grains and attrition material, such as a suspension produced in the course of the mechanical machining of silicon, quartz or ceramic material, from a cutting fluid in which abrasive grains and the attrition material are dispersed that originates from the machined material and from the machining equipment. In the method, the suspension is separated by means of wet classification, with the liquid used for the sizing process being selected in such a way that it can be mixed with the used cutting fluid and with the mixture so formed, which contains the attrition material originating from the machined material in particular, forming a stable suspension.

8 Claims, No Drawings

METHOD FOR SEPARATING A MACHINING SUSPENSION INTO FRACTIONS

FIELD OF APPLICATION

The present invention relates to a method of separating a machining suspension into fractions, particularly of the type accumulating when silicon, quartz or ceramic materials are machined. A used machining suspension consists, as a rule, of a cutting fluid in which abrasive grains or attrition material of a cutting tool or a machining equipment, respectively, or of the machined material are dispersed.

Such machining suspensions are used, for example, in the manufacture of thin wafers of silicon or quartz for the semiconductor or solar technology, wherein the thin wafers are separated from mono-crystalline rods or cast blocks by application of the separating lapping technique. In one embodiment of this technique, a wire having a length of several kilometers is passed over a coil system in such a way that a wire netting will be created, which includes up to several hundreds of wires in side-by-side relationship. With the addition of the machining suspension, it is hence possible to saw several hundreds of thin wafers from a block or rod of appropriate length at the same time, in a single operation. The used machining suspensions are composed of a cutting fluid—preferably polyvalent alcohols or highly refined mineral oils with additives—with abrasive grains, preferably of silicon carbide (SiC) with different particle sizes, suspended therein. In the course of the mechanical machining of the silicon or quartz, the abrasive grains carried in the machining fluid is conveyed to and compressed at the site where it is to produce its machining effects, by means of the machining tools such as band saws, sawing wires or lapping disks.

The suspension used for the machining process, which carries the accumulating attrition material, is collected and recycled into the machining process again. As a matter of fact, however, the efficiency of the machining suspension reduces as the application period prolongs so that it must be replaced in the end because the given aim of the machining operation can no longer be achieved. The reason for this resides not only in the wear of the SiC material but mainly also in the increasing percentage of the fine particles of the silicon or quartz attrition material and in the iron attrition material from the machining tools. The range of a typical composition of such used suspensions is illustrated in Table 1.

TABLE 1

Typical composition of machining suspensions from the process of silicon wafer sawing

| Component | Percentage (mass fraction) |
|---|---|
| Silicon carbide | 20–70 |
| Cutting fluid | 20–70 |
| Silicon | 0–20 |
| Metal attrition material | 0–10 |

PRIOR ART

For processing a used machining suspension, only some few methods are known at present so that in practical operation the machining suspensions must frequently be disposed of as hazardous waste for incineration.

As a matter of fact, there are various possibilities available to increase the period of service, i.e. the number of the possible cuts to be performed per kilogram of suspension. To this end, for example, one can replace a partial volume of the used machining suspension after each cutting operation by a new machining suspension, or separate one part of the attrition material from the suspension by decanting. In all these methods, however, the used machining suspension must be disposed of after a more or less high number of cutting operations. As a rule, this is performed by way of disposal as hazardous waste by incineration with subsequent dumping of the residues.

As the costs of providing the machining suspension account for a substantial part of the total costs incurred by the mechanical machining of silicon, quartz or ceramic material, this widespread practical approach in disposal is not economic.

A method is known from the Patent Abstracts of Japan, in relation to JP 1-316170, wherein used machining suspensions are centrifuged and the abrasive or grinding grains, respectively, so separated are re-dispersed in fresh cutting fluid. It is a disadvantage of this method, however, that a high fraction of attrition material and of used cutting fluid remains still in the separated abrasive grains. This method does therefore not permit a distinct separation between the abrasive grains and the attrition material so that the possibilities of recycling the constituents of the machining suspension are very strongly restricted, too.

The European Patent EP 0916463A1 discloses a further method for separation of a machining suspension into fractions. In that method, the suspension is initially disintegrated by a distilling drying step into a solids component and a liquid component. Then a fractionating step, particularly a screening or air sizing technique, is applied for separating the dry solids component into a fine attrition fraction and a coarse abrasive grain fraction. Subsequently to this dry sizing step, the fraction containing the abrasive grains may be used again in a machining suspension. What is a disadvantage in the drying step, however, is the fact that the additives difficult to volatilize in cutting fluid remain in the solids component. Moreover, even the preferred vacuum operation for the successful drying of the solid material requires temperatures that may be detrimental to the cutting fluid in terms of disintegration. The cutting fluid material is then precluded from re-use. As a result of the subsequent dry air sizing technique, moreover undesirable agglomerates consisting of extremely fine particles may be transferred into the re-used coarse fraction. The reason for this are residues of the cutting fluids that fuse the particles together.

A strict separation between the fractions contained in the machining suspensions can therefore not be achieved either with this method. Successful separation into fractions is, however, the prerequisite for a high-quality salvage and for re-use of the components. Particularly in the case of an intended salvage of used SiC material in the field of ceramics or abrasive grain manufacture, a strict isolation of silicon attrition material from the metal attrition material is required. With the known methods according to prior art, such a separation could so far not be achieved.

In another known method according to the U.S. Pat. No. 3,9978,359 for the separation of individual components from a cutting fluid, the separation of the attrition material from the abrasive grains is carried out only after a separation of the cutting fluid in several washing and rinsing operations with a subsequent drying step so that the aforedescribed problems may occur.

The European Patent EP 0 786 317 A2 discloses a method of processing used machining fluids of the claimed general type, such as cutting fluids; this method serves to separate the abrasive grains from the machining liquid. In that method, initially water is added to the oily machining liquid in order to reduce the viscosity of the machining liquid by the formation of an oil/water emulsion. Then, in a wet sizing step, the abrasive grains are separated from the liquid phase consisting of oil, water and attrition material. With such a technique, however, the intended strict separation of the abrasive grains from the attrition material and the cutting fluid is not achieved either.

The present invention is now based on the problem of providing a method of separating a machining suspension into fractions, by means of which the abrasive grains can be reliably and precisely separated from the attrition material and the cutting fluid so as to permit the successful re-use of the individual components of the machining suspension.

SUMMARY OF THE INVENTION

The problem is solved with the method according to claim 1. Expedient embodiments and improvements of the method are the subject matters of the dependent claims.

In the inventive method, initially a liquid processing aid is selected for the reduction of the viscosity as a function of the respective cutting fluid used and of the attrition material, which processing aid can be mixed with the cutting fluid (i.e. is miscible therewith), which mixture in its turn forms a suspension together with the attrition material. Those skilled in the art are hence able to select from the group of processing aids miscible with the cutting fluid those materials that form such a mixture or suspension, respectively. A great number of liquids known as extraction agents are available to this end.

The cutting suspension is finally separated, with application of the selected processing aid, in a wet sizing installation, for example in a counter-current classifier, where the abrasive grains can be drawn off as coarse fraction and a large volume of the attrition material is suspended in the mixture of cutting fluid and processing aid and can be drawn off as fine-particle fraction.

In this method, the selection of a liquid processing aid plays an important role, whose mixture with the cutting fluid constitutes a stable suspension with the attrition material but not with the abrasive grains. In conventional methods for the extractive separation of cutting fluids from used suspensions, waste material and deposits or sludge, the selection of the solvent has so far been determined merely by its capacity and selectivity relative to the cutting fluid to be dissolved.

For the inventive method, by contrast, the property is utilised that some mixtures of cutting fluid and processing aid form stable suspensions with the attrition material originating from the machined material—in the case of silicon processing, hence the silicon particles. The term "mixture" is preferably to be understood here in the sense of a mono-phase system (homogeneous mixture). After the addition of processing aids, particularly solvents miscible with the cutting fluid, and after mixing the same with the machining suspension, it is noticeable that due to the reduction of the viscosity a separation of the suspension into a sediment and supernatant takes place, with the cutting fluid being largely transferred into the supernatant.

It was a surprise to find that certain mixtures of processing aid and cutting fluid form a stable suspension with the attrition material contained in the machining suspension, such as the silicon attrition material, whilst other mixtures do not behave in this manner. The stable suspensions so formed persist over several weeks, without achievement of a complete sedimentation of the attrition material.

This effect of suspension of the attrition material from the machined material into the mixture of a processing aid with the cutting fluid is utilised in an expedient manner in the inventive method for an efficient separation of the attrition material originating from the processed material from the abrasive grains, in combination with a wet sizing operation. The required volume of the liquid processing aid in the wet classifier for an efficient separation of the cutting fluid and the attrition material, which originates from the machined material, from the fraction of sized abrasive grains is thus reduced to a minimum.

A processing aid suitable for the inventive method, preferably a solvent, hence transforms both the cutting fluid and the attrition material originating from the machined material into the supernatant in a single-step immersion extraction step already, whilst it leaves the abrasive grains in the sediment approximately completely. With a small volume of solvent only, in combination with a wet classifier, hence a complete separation of the attrition material, which originates from the machined material, from the fraction of the abrasive grains can be successfully achieved. The abrasive grain fraction can be drawn off as coarse fraction, and metal particles can be removed therefrom, if necessary, by further sizing and/or by magnetic deposition for being recycled into the process again after separation of the solvent.

In the event that the shape of the grains in the abrasive grain fraction should no longer permit the application as abrasive grain material, particularly when sharp cutting edges are missing after multiple use, salvage of the material is possible in a different field due to the performed clean separation between the abrasive grains, the cutting fluid, the attrition material and the metal. In this manner, for abrasive grains consisting of SiC, the application as expensive raw material for industrial ceramics or for special abrasive bodies offers itself. Such a salvage for SiC fractions from machining suspensions cannot be realised with the processing methods according to prior art, due to the insufficient separation.

An essential advantage of the inventive method consists in the capability of the abrasive grains to be cleanly separated from both the cutting fluid and the attrition material. By contrast against all methods so far known, it is possible with the present method to achieve a clear separation of machining suspensions that can no longer be usefully employed for machining silicon, quartz or ceramic material, into the substance fractions of abrasive grains, machined material, metal attrition material and machining fluid. Only this separation into fractions is the prerequisite for salvage of the substances.

As a rule, all the fractions of the used machining suspension can be expediently salvaged, which are obtained in a form separated with the inventive method.

In the case of cutting fluids on the basis of mineral oil, examples of processing aids presenting the properties necessary for the realisation of the inventive method are lipophilic solvents, preferably hexane, heptane, or similar substances. In the case of cutting fluids on the basis of polyvalent alcohols, amphiphilic solvents, preferably acetone or the like, form a stable suspension that contains predominantly the attrition material originating from the machined material.

Counter-current classifiers or centrifugal classifiers are preferably used as wet sizing or classifying equipment.

In an expedient improvement of the method, the wet classifying step can bee supplemented by a deposition of Fe-metals, which step is preferably carried out with a known device for magnetic metal deposition in liquid systems. This device may be integrated into the classifier and may also be attached outside the classifier for purifying a drawn-off fraction. With such additional treatment, it is possible to achieve a purity for SiC as abrasive grain, which permits the salvage of SiC both in the original process and for industrial ceramics and abrasive bodies.

The suspension of the mixture of the processing aid and the cutting fluid, which is obtained from the wet classifier, may also be separated by methods known per se. For example, mechanical separation processes such as filtration, separation or combinations of these methods can be carried out in order to separate the solids from the liquid. It is equally possible, however, to separate initially the processing aid or the solvent, respectively, e.g. by a distilling technique, and to mix then the remaining mixture of cutting fluid and attrition material with another solvent that forms a mixture with the cutting fluid but not a suspension with the attrition particles. In the case of a cutting fluid on the basis of mineral oil, an amphiphilic solvent such as acetone is appropriate to this end. In such a case, the attrition material is very easy to separate mechanically.

Due to a pre-treatment of the cutting fluid, a variation of the aforedescribed method may result in a reduction of the cutting fluid level. To this end, the machining suspension is initially treated with a solvent that does not form a stable suspension with the attrition material from the machined material and the cutting fluid. The mixture of cutting fluid and solvent so obtained can then be separated again after a simple filtration by distillation in order to obtain the cutting liquid and the solvent.

The inventive method can be applied to all known machining suspensions for the mechanical machining of brittle materials such as silicon, quartz or ceramics, in which contain the abrasive grains in dispersed form in a cutting fluid.

The method is also applicable, however, to machining suspensions arising in the mechanical machining of other materials. Whilst a separation of ferromagnetic materials does not give rise to problems, as a rule, the particular advantage of the inventive method mainly resides in the feature that non-ferromagnetic materials can be easily separated from the abrasive grains. It is irrelevant, as a matter of course, whether the attrition material originates from the machined material or from the machining tool.

The used machining suspensions occurring in the principal field of application of the method and produced in the course of mechanical machining of silicon, quartz or ceramic materials consist of the cutting fluid in which the abrasive grains as well as the attrition material are dispersed, which originates from the machined material and from the machining tool, e.g. a wire saw. Here, hard-solid particles, e.g. of aluminium oxide, silicon or boron carbide, are used whose mean grain diameter is preferably within the range from 3 to 50 $\mu$m.

DETAILED DESCRIPTION OF AN EMBODIMENT OF THE INVENTION

The following is a description of an example of the separation of a machining suspension into fractions, which is produced in the operation of separating lapping of silicon. The machining suspension present after the separating lapping operation contains, in the present example, mass fractions of roughly 55% SiC as abrasive grain material, roughly 30% of highly refined mineral oil as cutting fluid, roughly 12% of silicon attrition material and roughly 3% of Fe metal attrition material.

The machining suspension is supplied into a counter-current classifier that is operated with hexane as processing aid appropriate for this system. The ratio between the suspension and hexane amounts to 1:2 approximately. An abrasive grain fraction is drawn off as coarse fraction which consists of SiC by 95%.

The separation between the silicon attrition material and the abrasive grain consisting of SiC is so good already in the wet classifying step that further steps are not necessary for separating these components. In this example, the abrasive grain fraction contains a level of silicon attrition material, which is as low as less than 2%.

Fe metal particles are eliminated from the coarse abrasive grain fraction in the known manner by magnetic deposition. After such a treatment, the SiC level amounts to roughly 98%.

What is claimed is:

1. Method of separating a machining suspension into fractions, which consists of a cutting fluid in which at least abrasive grains as well as attrition material are dispersed, comprising the following steps:

wet classification of said machining suspension by application of a liquid processing aid, said liquid processing aid being selected to form a mixture with said cutting fluid, which mixture forms a stable suspension with said attrition material persisting over a plurality of weeks without complete sedimentation of the attrition material;

discharge of one or several fractions containing abrasive grains and of cutting fluid and said processing aid wherein metal attrition material from a machining tool is present in said separated fraction or fractions containing abrasive grains;

subjecting said fractions containing abrasive grains and metal attrition material to post-treatment by a magnetic separating method for separation of the metal attrition material; and drying said separated fraction(s) containing abrasive grains and metal attrition material and condensing any liquid processing aid evaporated during the drying operation.

2. Method according to claim 1, wherein when a cutting fluid formed of alcohols is used, an amphiphilic liquid is employed as liquid processing aid.

3. Method according to claim 1, wherein when a cutting fluid is present which is formed on the basis of hydrocarbons, a lipophilic liquid is used as liquid processing aid.

4. Method according to claim 1, 2 or 3, wherein one or several fractions are discharged in said wet classification step which contain metal attrition material from a machining tool.

5. Method according to claim 1, wherein solids are mechanically separated from the mixture of cutting fluid and processing aid with the attrition material suspended therein.

6. Method according to claim 1, wherein the liquid processing aid is separated from said cutting fluid by a distilling method and is recycled into said wet classification step.

7. Method according to claim 1, wherein the wet classification step is carried out by a counter-current or centrifugal technique.

8. Method according to claim 1, wherein for a reduction of the cutting fluid level, the machining suspension is mixed initially, prior to wet classification, with a solvent that is mixed with said cutting fluid, which mixtures does not form a suspension with the attrition material originating from the machined material, with the mixture then being partly filtered whilst said solvent is separated again from the machining suspension by distillation.

* * * * *